United States Patent
Burkhard et al.

(10) Patent No.: US 6,194,672 B1
(45) Date of Patent: Feb. 27, 2001

(54) BALANCE WITH A MECHANICAL COUPLING AREA FOR A CALIBRATION WEIGHT

(75) Inventors: Hans-Rudolf Burkhard, Wila; Ferdinand Schneider, Winterthur, both of (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 09/307,390

(22) Filed: May 7, 1999

(30) Foreign Application Priority Data

May 8, 1998 (DE) .............................. 198 20 637

(51) Int. Cl.[7] .............................. G01G 3/14; G01G 3/08; G01G 23/01
(52) U.S. Cl. .................................. 177/210 EM; 177/229; 73/1.13
(58) Field of Search .................................. 73/1.13, 1.15; 177/50, 210 EM, 229

(56) References Cited

U.S. PATENT DOCUMENTS

| | | | | |
|---|---|---|---|---|
| 4,799,561 | * | 1/1989 | Komoto | 177/229 |
| 4,890,246 | * | 12/1989 | Oldendorf et al. | 177/210 EM |
| 4,932,487 | * | 6/1990 | Melcher et al. | 177/50 |
| 4,977,969 | * | 12/1990 | Leisinger et al. | 177/50 |
| 5,340,951 | * | 8/1994 | Hungerbuhler et al. | 177/229 |
| 5,550,328 | * | 8/1996 | Freemen et al. | 177/50 |
| 5,721,398 | * | 2/1998 | Balsen et al. | 177/229 |
| 5,866,854 | * | 2/1999 | Emery et al. | 177/50 |

FOREIGN PATENT DOCUMENTS 196 05 087 A1    8/1997 (DE) .

* cited by examiner

*Primary Examiner*—Randy W. Gibson
(74) *Attorney, Agent, or Firm*—Friedrich Kueffner

(57) ABSTRACT

In a balance with a parallel-guided load receiver (5) and a force-reduction mechanism using a series of two levers (18, 30), the input arm (17) of the first lever (18) to which the weight force of the load to be weighed is applied is extended into the space outside of the load receiver (5) and past a force transducer (43) arranged in that space, the end of the extension being equipped with a coupling area (58) for a calibration weight (59). This accomplishes a large lever-reduction of the calibration force in combination with a compact configuration, thus allowing a full-load calibration of the balance to be performed with a relatively small calibration weight (59).

14 Claims, 3 Drawing Sheets

(a)

(b)

BALANCE WITH A MECHANICAL COUPLING AREA FOR A CALIBRATION WEIGHT

BACKGROUND OF THE INVENTION

1. Field of the Invention

The present invention concerns a balance in which the weight force of a load to be weighed is introduced through a load receiver that is constrained in parallel-guided motion by two guide links extending in parallel at a distance from each other, each of the guide links being connected at one end to the load receiver and at the opposite end to a stationary part of the balance. The load receiver is guided in relation to the stationary part of the balance in a parallel-displacement mode within the plane of the parallelogram that is defined by the four ends of the guide links. The balance has a force transducer to convert the weight force into an electrical signal and a lever mechanism for transmitting the weight force from the load receiver to the force transducer with a first and a second lever as well as a mechanical coupling area for the releasable connection with a calibration weight., The first lever has an input arm extending from a coupling that introduces the force from the load receiver and is formed on a load receiver portion facing the stationary part to a first support that serves as lever fulcrum and is formed on a portion of the stationary part facing the load receiver; and the first lever also has an output arm extending from the support in the direction towards the stationary part. Receiving the force through a coupling from the output arm of the first lever, the second lever is held by a second support serving as lever fulcrum formed on a portion of the stationary part facing the load receiver; and the second lever also has a portion that extends in the direction towards the load receiver and serves to further transmit the weight force to the force transducer.

2. Description of the Related Art

In a known balance of this kind (DE 196 05 087 A1) whose lever mechanism has a total of three levers for the successive reduction of the weight force introduced into the load receiver, the coupling area that serves for the connection of the calibration weight is arranged on an arm of the third lever that is coupled to the second lever (the third lever following the second lever in the force reduction chain). A small calibration force introduced to this coupling area thus corresponds to a weight force on the load receiver of a multiple amount that is determined by the reduction ratio of the lever mechanism. Therefore, by using this arrangement of the coupling area, the application of a relatively large weight force to the load receiver may be simulated by a calibration weight of desirable small size. In particular, with a calibration weight corresponding only to a small fraction of the capacity load of the balance, it is possible to perform a calibration as if a full load were placed on the balance.

However, with this simulated application of the full capacity load it is not possible in the calibration process to cancel errors in the lever ratio occurring in those levers of the mechanism that precede the lever that is equipped with the coupling area. Over the course of the lifetime of a balance, lever ratio errors of this kind can easily develop because the levers that follow the first lever are supported and coupled to each other by very delicate, thin flexure pivots that can suffer deformations when the balance is subjected to shocks.

SUMMARY OF THE INVENTION

The object of the present invention is to develop a balance of the kind described at the beginning in such a manner that, with a calibration weight corresponding to only a fraction of the full load of the balance, it is possible to perform a full-load calibration unimpaired by ratio errors of the lever mechanism where the risk that the calibration is affected by lever ratio errors from extraneous causes is largely avoided.

According to the invention, the solution of this problem is to provide the input arm of the first lever with an extension that extends beyond the coupling into the space adjoining the side of the load receiver facing away from the stationary part, at which location the extension is equipped with a coupling area for the calibration weight.

With the inventive solution, the calibration weight by way of the extension acts immediately on the input arm of the first lever. Possible ratio errors occurring in the parts of the lever mechanism after the input arm of the first lever, e.g., as a result of shock-induced deformations of the couplings and fulcrums of the levers, are cancelled in the calibration process. By giving an appropriate length to the extension beyond the point where the coupling connects the load receiver with the input lever arm in proportion to the length of the input lever arm between the coupling and the first support, the calibration force that correlates with the full-capacity load of the balance is reduced correspondingly, e.g., to an amount of $\frac{1}{10}$ to $\frac{1}{40}$ of the full-capacity load. Thus, the full-load calibration can be performed with a relatively small calibration weight resulting in design economies in the size and weight of the balance.

In an advantageous embodiment of the invention, the coupling area for the calibration weight contains a guide for positioning the calibration weight on the extension, guiding the calibration weight to take its defined working position under the influence of gravity. In this, the location where the calibration weight is transferred to the guide does not have to be defined with any particular accuracy. As the calibration weight passes along the guide under the influence of gravity, it automatically reaches its precisely defined working position, so that its distance from the first support of the first lever is maintained very accurately in the calibration process.

A practical configuration of the inventive balance has the characteristic feature that the extension of the input arm of the first lever is formed by two legs located at a distance from each other on opposite sides of the plane of the parallelogram. The ends of the legs that are nearer to the stationary part are firmly attached to the first lever, the coupling area for the calibration weight is formed at the opposite ends of the legs, and the load receiver extends between the legs with lateral clearance. This allows the two legs to be dimensioned in a manner that is appropriate for the desired full-capacity load and the desired weight amount of the calibration weight, independent of the interior space of the parallelogram enclosed by the load receiver, the stationary part and the two guide links. In particular, the legs may be configured as separate from the first lever and attached to the latter with screws.

In a further useful embodiment within this context, the ends of the two legs that form the coupling area are designed in the shape of receiving forks oriented against the direction of gravity for the calibration weight to be deposited in the direction of gravity. When the calibration weight is set down, it will seat itself in the receiving fork to a depth where it is positioned without any horizontal play in its precisely defined location relative to the first support of the first lever, thereby allowing the calibration process to be performed with a high degree of accuracy.

For reasons of structural rigidity, it is practical to connect the two legs by a brace extending transverse to the plane of the parallelogram in the area of the ends that form the coupling area.

In accordance with a further thought of the present invention, the force transducer is located in a space delimited on the one hand by the side of the load receiver facing away from the stationary part and on the other hand by the coupling area for the calibration weight; and the portion of the second lever that runs in the direction towards the load receiver has an extension that reaches to the force transducer. In this embodiment, the space required for the force transducer is at the same time available for the extension of the input lever arm that extends through this space in the direction of the plane of the parallelogram, whereby a desired large lever ratio for the calibration weight is achieved in a space-saving configuration.

As an advantageous further development within this context, the force transducer is mounted on two support members located at a distance from each other on opposite sides of the plane of the parallelogram, which support members extend with lateral clearance alongside the load receiver and are attached to a portion of the stationary part that is oriented towards the load receiver.

Also, it is advantageous for the extension of the second lever to be formed by two extension legs that are located at a distance from each other on opposite sides of the plane of the parallelogram and are attached to the portion of the second lever that extends in the direction towards the load receiver, the latter taking up the space between the extension legs but leaving a lateral clearance gap. In this, the laterally arranged legs are of a design that provides the desired rigidity in relation to the force they are subjected to while at the same time the lateral space required for them is minimized.

The inventive configuration is advantageously realized in balances where the force transducer is an electromagnetic force compensation system whose load compensation coil is arranged at the ends of the extension legs that reach towards the force transducer. In balances of this kind, a current flowing through the load compensation coil is servo-controlled in such a manner that the magnetic force acting on the load compensation coil is in equilibrium with the force generated by the weight of the load to be weighed, whereby the load receiver and the lever mechanism are maintained in their null position under the control of a displacement sensor. In this way, the current flowing through the load compensation coil provides a measure for the load to be weighed.

A particularly important embodiment has the characteristic trait that the load receiver, the guide links, the stationary part and the levers are formed out of one material block as integrally connected material portions that are separated by material-free spaces. This unitary design configuration eliminates the assembly process for connecting these components with its particular requirements for an ultra-precise position adjustment of the fulcrum supports of the levers and of all coupling points.

As a particular advantage, the invention provides that the material-free spaces are at least in part formed only by thin linear cuts that traverse the material block in the direction perpendicular to the plane of the parallelogram. These thin linear cuts may be produced, for example, by spark erosion. Because the space required for the material-free spaces is minimal in this case, this leads on the one hand to a very compact arrangement. On the other hand, the available space for the material portions forming the individual parts of the parallel-guiding and lever mechanism is maximized, so that these parts can be designed for especially high strength.

Further included within the scope of the invention is a lifting mechanism associated with the coupling area for the calibration weight, allowing the calibration weight to be transposed between a calibrating position where it is supported by the coupling area and a rest position where it is lifted off the coupling area. Due to this lifting mechanism, the calibration weight does not need to be operated manually. Rather, the calibration process can be performed by actuating the lifting mechanism through an operator keyboard on the balance.

In this arrangement, it is of advantage for the calibration weight to have essentially the shape of an elongated cylinder with the longitudinal axis of the cylinder at a right angle to the direction of gravity, with the lifting mechanism preventing the cylinder from rotating about its longitudinal axis. Unless a high production cost for the calibration weight is considered acceptable, the gravitational center line of the cylindrical calibration weight will have minor eccentricities and deviate from the longitudinal axis of the cylinder. By constraining the rotation of the cylinder, these deviations from rotational symmetry are prevented from causing measurable variations between successive calibrations. Thus, calibration errors are avoided in spite of the lack of rotational symmetry.

In a practical embodiment, the cylindrical surface of the calibration weight contains a planar portion that rests in a rotationally constrained condition on three support points of a lifter element of the lifting mechanism that performs the transposition of the weight between its rest position and its calibrating position. Due to this three-point support, an invariant angular position of the calibration weight is maintained with a high degree of accuracy, thereby ensuring a highly accurate calibration.

Other characteristic features, details, and advantages of the invention will be presented in the following description and in the drawing that is also being referred to for the disclosure of all details essential to the invention that are not expressly mentioned in the text.

DETAILED DESCRIPTION OF THE INVENTION

Figures 1, 2:
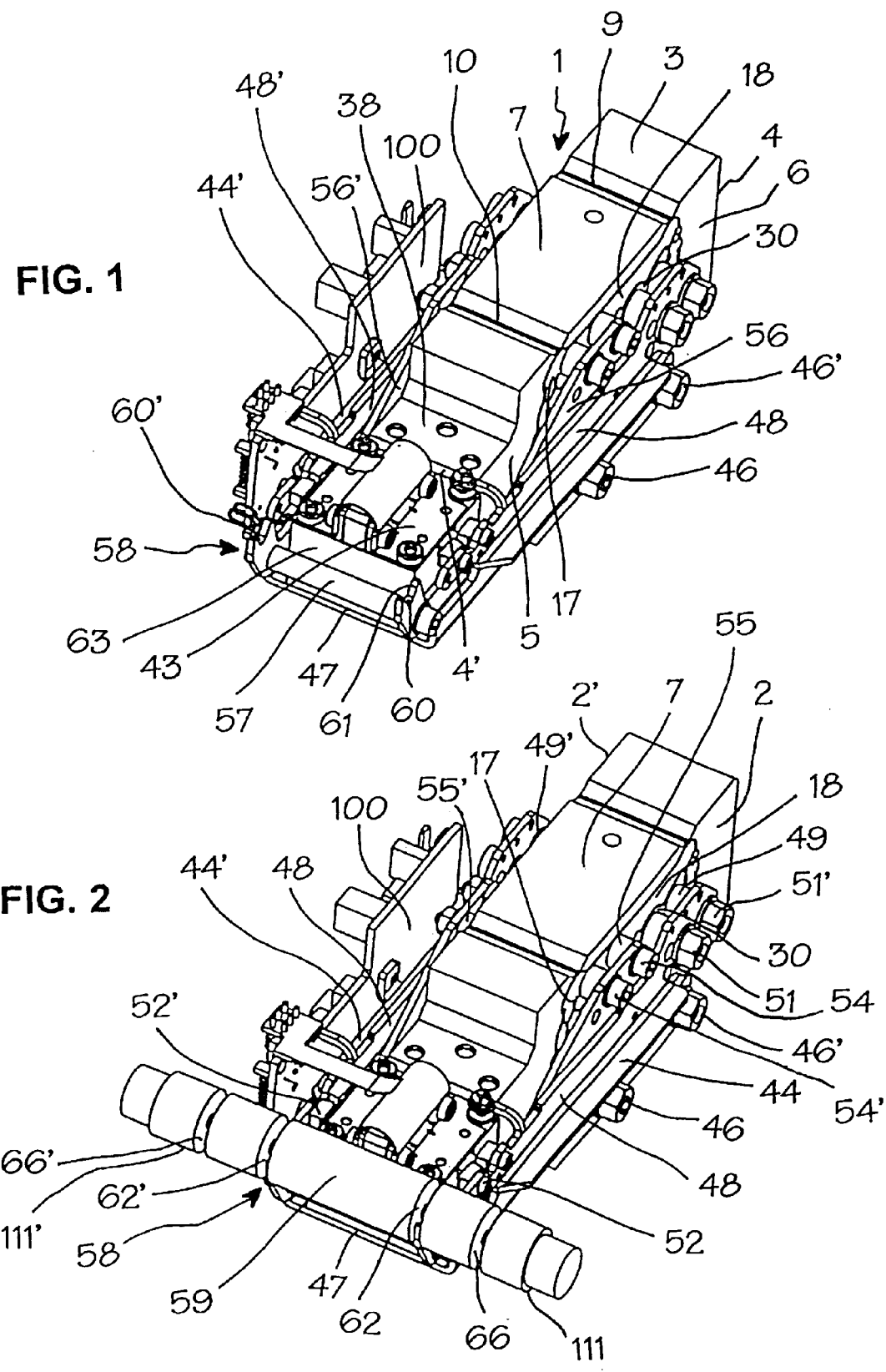
FIG. 1 represents a perspective view of essential parts of the balance where the enclosure, the weighing pan and the calibration weight have been removed, seen under the angle of a viewer looking from the side and slightly above the balance.
FIG. 2 represents a view corresponding to FIG. 1 but with the calibration weight in position.
Figure 3:
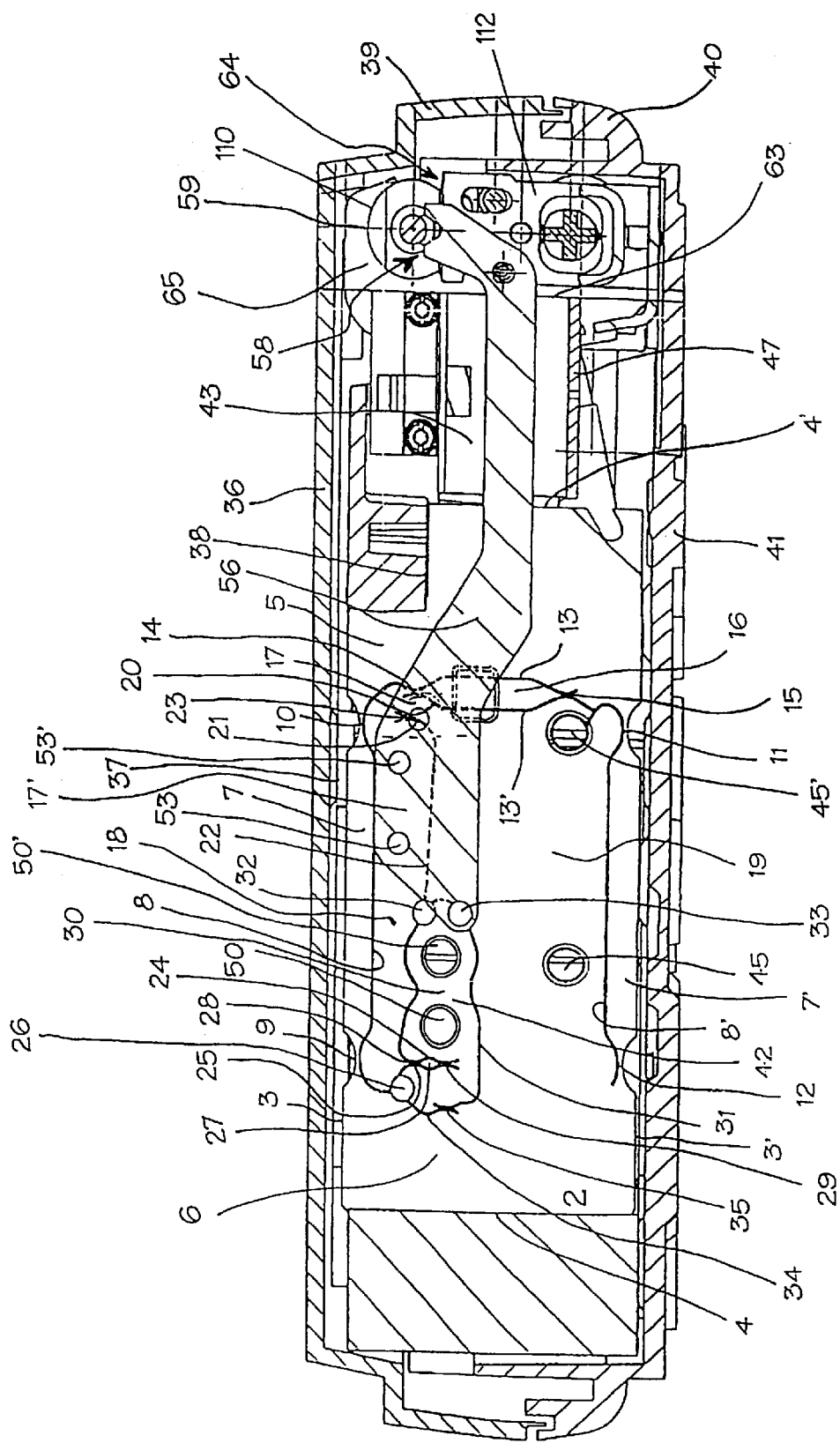
FIG. 3 represents a partially cut-away view looking at the balance from the side.

As shown in FIGS. 1 to 3, the balance contains a unitary material block 1, of which the two largest side surfaces 2, 2' extend parallel to the plane of the drawing in FIG. 3, with one of the material block's two largest side surfaces 2 in FIG. 3 facing the viewer. Of the two other pairs of narrow sides that are perpendicular to the pair of the material block's two largest side surfaces 2, 2', one of the two longer narrow sides 3 faces up while the downward-facing longer narrow side 3', running parallel to 3, is hidden to the viewer. Further in FIGS. 1 and 2, one of the shorter narrow sides 4 faces to the rear while the forward-facing shorter narrow side 4' that runs parallel to 4 is essentially covered from view.

Formed as portions of the material block 1 are a load receiver 5, a stationary part 6 and two mutually parallel guide links 7, 7' whose respective outside surfaces, facing away from each other, are delimited by the longer narrow sides 3, 3' and whose respective inside surfaces, facing towards each other, are delimited by thin linear cuts 8, 8' forming material-free spaces. The ends of the guide links 7, 7' by which the latter are joined on the one side to the load receiver 5 and on the other side to the stationary part 6 are configured as thin flexible portions 9, 10, 11, 12, which are defined by curved segments of the thin linear cuts 8 and 8' deviating towards the respective narrow side 3, 3' that delimits the outside of the respective guide link 7, 7' and on the opposite side, like mirror images, by curved recesses in the narrow sides 3, 3'. These thin flexible portions 9 through 12 define the corner points of a parallelogram whose plane extends parallel to the plane of the drawing in FIG. 3.

The thin linear cuts 8, 8' which, except for their curved segments, run essentially parallel to the longer narrow sides 3, 3', have sections 13 and 13', respectively, continuing beyond the thin flexible portions 10, 11 on the load-receiver side, running essentially parallel to an imaginary line connecting the thin flexible portions 10, 11 on the load-receiver side, and extending into the vicinity of the respectively opposite guide link 7', 7, where they have curved segments with mirror-image convex arches facing each other and thereby defining thin flexible coupling portions 14, 15 connected by a coupling member 16 that is delimited by the mutually parallel portions of sections 13 and 13'. The coupling member 16 is connected to the load receiver 5 through the thin flexible coupling portion 15 near the guide link 7'.

At the thin flexible coupling portion 14 at the opposite end from the thin flexible coupling portion 15, the coupling member 16 is connected to the input lever arm 17 of a first lever 18, the latter being delimited on the side nearer the longer narrow side 3 by the thin linear cut 8 that delimits the guide link 7. In a portion 19 of the stationary part 6 extending between guide links 7, 7' in the direction towards the load receiver 5, a thin linear cut section 20 extends from the thin linear cut section 13' in the direction towards the longer narrow side 3, forming a curve that is convex towards the shorter narrow side 4. Shaped like a mirror image on the opposite side of an imaginary line connecting the thin flexible portions 10, 11 near the load receiver, the thin linear cut section 20 has as its counterpart a linear cut section 21 which continues at the end nearer to guide link 7' into another thin linear cut 22 that runs in the direction towards the shorter narrow side 4 delimiting the stationary part 6, subsequently approaches an imaginary line that connects the thin flexible portions 9, 12 near the stationary part, then follows part of the way along that line in the direction towards the narrow side 3' that is farther from the first lever 18. Following further along the aforementioned imaginary straight line, the continuation 24 of the thin linear cut 22 has curved end portions whose convex sides face the imaginary straight line. On the opposite side of the imaginary straight line, a linear cut section 25 runs like a mirror image of the continuation 24 and terminates in a drilled hole 26 that is also the end of the thin linear cut 8 delimiting the first lever 18. This drilled hole 26 may serve to introduce a spark-erosion wire in case the thin linear cuts are made by the process of spark erosion. Instead of arranging the thin flexible portions 9, 12 on the imaginary straight line perpendicular to the longer narrow sides 3, 3' as described above, the thin flexible portions could also be slightly offset in relation to each other. Likewise, the thin flexible portions 10, 11 do not need to be one above the other vertically.

Similar to the linear cut sections 13, 13' that form the coupling member 16, the continuation 24 and the linear cut section 25 between each other delimit a second coupling member 27 with a thin flexible portion 28 at the end that connects to the first lever 18.

Likewise, at the opposite end from the thin flexible portion 28, the coupling member 27 has a thin flexible portion 29 where the coupling member 27 is connected to the second lever 30 which, on the side facing the first lever 18, is delimited by the linear cut section 22. On the side facing away from the first lever 18, the second lever 30 is separated from the portion 19 of the stationary part 6 by a thin linear cut 31 extending essentially in the lengthwise direction of the longer narrow sides 3, 3'. At the end closer to the load receiver 5, the thin linear cut 31 runs through two drilled holes 32, 33 and connects to the thin linear cut section 22 that delimits the first lever 18. At the end closer to the stationary part 6, the thin linear cut 31 in a convex curve approaches an imaginary straight line that is parallel to the imaginary straight-line connection between the thin flexible portions 9, 12 adjacent to the stationary part 6. On the opposite side of the imaginary straight line, a convex curve segment of a short linear cut section 34 runs like a mirror image of the convex curve of linear cut 31 and terminates in the drilled hole 26. The material portion delimited by the convex curve segments forms a thin flexible portion 35 representing a second support point that serves as the fulcrum for the second lever 30.

Thus, for transmitting forces, the second lever 30 is coupled to the output arm 17' of the first lever 18 (the output arm 17' extending between the thin flexible portion 28 of the second coupling member 27 and the first support 23) while the input arm 17 of the first lever 18, extending between the first support 23 and the thin flexible coupling portion 14, is coupled to the load receiver 5. A weighing pan (not shown) for a load to be weighed, located above the guide link 7 delimited by the longer narrow side 3, is attached to a support surface 38 (very clearly visible in FIGS. 1 and 2) of the load receiver 5 by means of a cantilevered support 37 shown only schematically and partially cut away in FIG. 3. Not shown in the drawing, a support post attached to the cantilevered support 37 and carrying the weighing pan projects through an opening of an enclosure top 36 above which the weighing pan is located. The peripheral rim 39 of the enclosure top 36 is skirted down to meet an upstanding rim 40 of a balance base plate 41 on which the stationary part 6 is mounted in a manner not illustrated in detail. When a load is placed on the weighing pan, the load receiver 5 will therefore tend to move downward, parallel to the imaginary straight line through the thin flexible portions 10, 11, and as a result the first lever 18 in the representation of FIG. 3 will tend to rotate clockwise about the support 23, while the second lever 30 (being coupled to the first lever 18) will tend to rotate counter-clockwise about the second support 35. The tendency of the lever mechanism comprising the first and second levers 18, 30 to move in this manner is due to the fact that the first lever 18 is a two-armed lever, meaning that its input arm 17 and its output arm 17' extend in opposite directions from the first support 23, while the second lever 30 is a one-armed lever, i.e., the lever portion from the fulcrum formed by the second support 35 to the thin flexible portion 29 extends in the same direction as the lever portion 42 that extends from the thin flexible portion 29 in the direction towards the load receiver 5.

The incipient motion of the lever mechanism is transferred to a force transducer 43 adjacent to where the outside of the load receiver 5 is delimited by the shorter narrow side 4' of the material block 1'. As shown in FIGS. 1 and 2, the force transducer 43 is mounted to the stationary part 6 by means of two cantilever arms 44, 44' that are attached to the side surfaces 2, 2' (which run parallel to the plane of the parallelogram) of the block by screw bolts 46, 46' engaged in tapped holes 45, 45' (FIG. 3) in the portion 19 of the stationary part that extends towards the load receiver 5. Inserted between the side surfaces 2, 2' of the block and the respective cantilever arm 44, 44' are spacers to ensure that the load receiver 5 as well as other parts of the balance that will be described later have lateral play between the cantilever arms 44, 44'. In the portion projecting beyond where the load receiver 5 is delimited by the shorter narrow side 4' of the material block 1, the two cantilever arms are connected by a platform 47 transverse to the displacement direction of load receiver 5, with the force transducer 43 being mounted on the platform 47. In the embodiment shown, the force transducer consists of a force compensation system as known to those skilled in the art in which a load compensation coil, receiving through the lever mechanism the leveraged weight force of the load to be weighed, is immersed in the air gap of a permanent magnet system mounted on the platform 47, and where the compensation current flowing through the force compensation coil is controlled by an electronic servo-control unit 100 of the balance in such a manner that the resultant interactive force between the permanent magnet system and the force compensation coil counterbalances the effect of the weight force, whereby the lever system is caused to maintain its null position which is registered by a position detector connected to the input of the servo-control unit 100.

To transfer the weight force after it has been reduced by the lever mechanism, the portion 42 of the second lever 30 that extends in the direction of the load receiver 5 is provided with two extension legs 48, 48'. With clearance provided by spacers 49, 49', these extension legs 48, 48' are each attached at one end by screw bolts 51, 51' engaged in tapped holes 50, 50' (FIG. 3) in the portion 42 of the second lever to those parts of the largest side surfaces 2, 2' of the block 1 that delimit the second lever 30. The spacers 49, 49' are appropriately dimensioned, so that the extension legs 48, 48' have free play within the space enclosed between the cantilever arms 44, 44' and the largest side surfaces 2 and 2', respectively. Attached to the other ends 52, 52' of extension legs 48, 48', away from the tapped holes 50, 50', is the force compensation coil that is immersed in the permanent magnet system.

Located across from each other on opposite sides of the plane of the parallelogram, two legs 56, 56' are attached by screw bolts 54, 54' (FIG. 2) engaged in tapped holes 53, 53' of the first lever (FIG. 3), with clearance provided by spacers 55, 55', to those sides of the first lever 18 that are delimited by the two largest side surfaces 2, 2'. The spacers 55, 55' are appropriately dimensioned, so that the legs 56, 56' have free play within the space enclosed between the respective largest side surface 2, 2' and extension leg 48, 48' of the pair of extension legs 48, 48' holding the force compensation coil.

From the ends that are attached to the first lever 18 by means of screw bolts 54, 54', the legs 56, 56' extend beyond the thin flexible coupling portion 14 of the first lever 18, alongside the load receiver 5, into the space occupied by the force transducer 43 and beyond the latter, thereby forming an extension of input lever arm 17 reaching beyond the narrower side 4' of material block 1 that delimits the load receiver 5 on the side facing away from the stationary part 6. At their opposite extremity from screw bolts 54, 54', the legs 56, 56' are connected by a brace 57 extending transverse to the plane of the parallelogram. Furthermore at that location on the legs 56, 56', a coupling area 58 is formed for a calibration weight 59. It is conceivable, but less advantageous, that the legs 56, 56' extend beyond the narrow side 4' of the material block 1 only as far as the space occupied by the force transducer 43 and are at that point continued far enough in an upward direction so that the coupling area will be located in a free space bordering on the top of the force transducer 43. To avoid errors caused by an out-of-level condition, an arrangement is preferred where the center of gravity of the calibration weight 59, the first support 23 of the first lever 18 and the thin flexible coupling portion 14 that connects the first lever 18 to the coupling member 16 are located on a common straight line.

The coupling area 58 is formed by the two ends of legs 56, 56', which are configured as receiving forks 60, 60'. In more detail, each of the forks 60, 60' has two prongs that diverge from their base pointing against the direction of gravity, the prongs having inside edges 61 serving as guides by which the calibration weight 59, being lowered in the direction of gravity, is guided towards the base of the prongs where, through positive contact, it is held in its precisely defined working position. For this purpose, the cylindrical calibration weight 59 is equipped with appropriately dimensioned holding grooves 62, 62' where the calibration weight 59 is engaged by the receiving forks 60, 60'.

Figure 4:
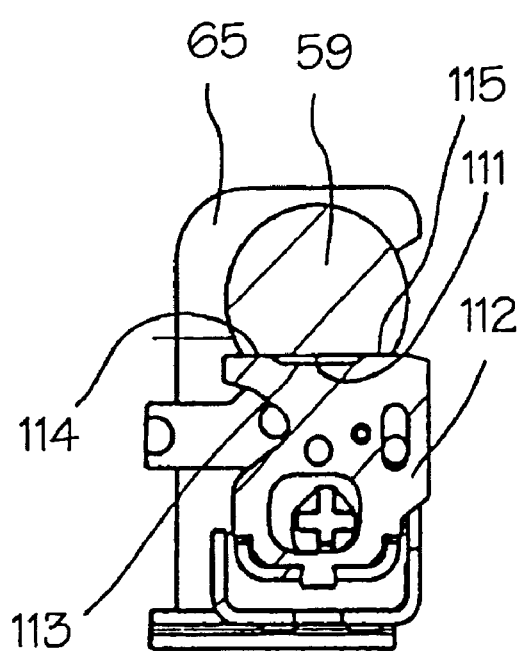
FIGS. 4(a) and (b) represent partially cut-away views of opposite sides of a lifting mechanism for the calibration weight.
Figure 4:
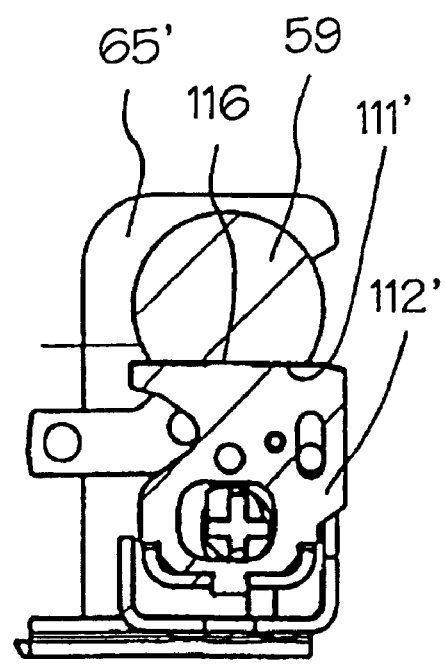

Arranged on the base plate 41 of the balance and closely adjacent to the front side 63 of the force transducer 43 (facing away from the material block 1), an electrically powered lifting mechanism 64 (FIGS. 3 and 4) serves in the calibration mode to lower the calibration weight 59 onto the coupling area 58, and for the normal working mode of the balance to lift it into a rest position where the calibration weight 59 is pushed home into a locked condition against a retaining bracket 65, 65' that engages circumferential retainer grooves 66, 66' of the calibration weight 59.

As a result of this arrangement, the calibration force applied through the calibration weight 59 is multiplied by a ratio that is determined on the one hand by the distance between the first support 23 and the coupling area 58 and on the other hand by the length of the input lever arm 17, i.e., the distance between the first support 23 and the thin flexible coupling portion 14. Thus, the balance can be calibrated at full-load condition with a relatively small calibration weight.

The representations of FIGS. 4(a) and (b), showing both sides of the lifting mechanism 64 in viewing directions perpendicular to the plane of the parallelogram, illustrate the feature that the essentially cylindrical calibration weight 59 has within its cylindrical surface 110 and running parallel to a tangential plane of the cylindrical surface 110 two mill-cut planar areas 111, 111', each extending from the respective holding groove 62, 62' (FIG. 2) into the area of the calibration weight 59 that lies between the two holding grooves 62, 62'. These two mill-cut planar areas 111, 111' together form a planar surface domain where the calibration weight is supported at a fixed angle of rotation by two lifter legs 112, 112' that are arranged below the mill-cut planar areas 111, 111' and belong to a lifter element of the lifting mechanism 64 that is movable in the direction of gravity between the rest position and the calibrating position. Formed on the end face of the lifter leg 112 that faces one of the planar mill-cut areas 111 and separated from each other by a recessed portion 113 are two localized support contacts 114, 115 on which the calibration weight 59 rests with its planar mill-cut area 111. In contrast, formed on the end face of the other lifter leg 112' that faces the other planar mill-cut area 111' there is only a single localized support contact 116 protruding above the general level of this end face. Therefore, the calibration weight 59 overall rests with its planar mill-cut areas 111, 111' only on the three support contacts 114, 115 and 116. In this manner, its angular orientation is precisely defined in the rest position. As a result, when lowered into the calibrating position, the calibration weight is always set down in the same angular orientation on the receiving forks 60, 60' of the coupling area 58.

LIST OF REFERENCE NUMBERS 1 material block
2, 2' largest side surfaces of the material block
3, 3' longer narrow sides of the material block
4, 4' shorter narrow sides of the material block
5 load receiver
6 stationary part
7, 7' guide links
8, 8' thin linear cuts
9, 10, 11, 12 thin flexible portions at ends of guide links
13, 13' sections of thin linear cuts
14, 15 thin flexible coupling portions
16 coupling member
17 input lever arm
17' output lever arm
18 first lever
19 portion of the stationary part
20 linear cut section
21 linear cut section
22 thin linear cut
23 first support
24 continuation of thin linear cut
25 linear cut section
26 drilled hole
27 second coupling member
28 thin flexible portion
29 thin flexible portion
30 second lever
31 thin linear cut
32, 33 drilled holes
34 linear cut section
35 thin flexible portion forming second support
36 enclosure top
37 cantilevered support
38 support surface
39 peripheral rim of enclosure top 36
40 upstanding rim of balance base plate 41
41 balance base plate
42 portion of second lever 30
43 force transducer
44, 44' cantilever arms
45, 45' tapped holes
46, 46' screw bolts
47 platform
48, 48' extension legs
49, 49' spacers
50, 50' tapped holes
51, 51' screw bolts
52, 52' ends of extension legs 48, 48'
53, 53' tapped holes
54, 54' screw bolts
55, 55' spacers
56, 56' legs attached to first lever 18
57 brace
58 coupling area
59 calibration weight
60, 60' receiving forks
61 guide (inner edge, guiding edge)
62, 62' holding grooves
63 front side of the force transducer 43
64 lifting mechanism
65, 65' retaining bracket
66, 66' retainer grooves
100 servo control unit
110 cylindrical surface
111, 111' mill-cut planar areas (planar portions)
112, 112' lifter legs
113 recessed portion
114, 115 support contacts
116 support contact

What is claimed is:

1. A balance that is equipped with
   A) a load receiver (5) that serves to introduce a weight force of a load to be weighed and is constrained relative to a stationary part (6) of the balance by two guide links (7, 7') running in parallel at a distance from each other and each of them being connected by thin flexible portions (10, 11) at one end to the load receiver (5) and by thin flexible portions (9, 12) at an opposite end to a stationary part of the balance for parallel-guided displacement of the load receiver (5) within a plane defined by a parallelogram through the four ends of the guide links (7, 7');
   B) a force transducer (43) that serves to convert the weight force into an electrical measuring signal, and
   C) a lever mechanism which has a first lever (18) and a second lever (30) as well as a coupling area (58) for the releasable connection with a calibration weight (59) and which serves to transfer the weight force from the load receiver (5) to the force transducer (43), wherein
   the first lever (18) has an input arm (17) extending from a thin flexible coupling portion (14) of a coupling member (16), connected with the load receiver (5) for force-transfer and formed in an area of the load receiver (5) facing towards the stationary part (6), to a first support (23), serving as lever fulcrum and formed on a portion (19) of the stationary part (6) facing towards the load receiver (5); and
   the first lever (18) also has an output arm (17') extending from the support (23) in the direction towards the stationary part (6); and
   the second lever (30) is held by a second support (35) that serves as fulcrum and is formed on the portion (19) of the stationary part (6) facing towards the load receiver (5), wherein further the second lever is coupled for force transfer with the output arm (17') of the first lever (18) and wherein the second lever has a portion (42) extending in the direction towards the load receiver (5) and serving to transfer the weight force to the force transducer (43);
   comprising the improvement that
   the input arm (17) of the first lever (18) has an extension which reaches beyond the thin flexible coupling portion (14) as far as a space adjacent to a side (4') of the load receiver (5) facing away from the stationary part (6), the extension in said space being equipped with the coupling area (58) for the calibration weight (59) so that a calibration weight acts immediately on the input arm (17) of the first lever (18) via the extension.

2. The balance according to claim 1, wherein the coupling area (58) for the calibration weight (59) comprises a guide

(61) which serves to position the calibration weight (59) on the extension and along which the calibration weight (59) under the influence of gravity is guided into its working position.

3. The balance according to claim 1, wherein the extension of the input arm (17) of the first lever (18) is formed by two legs (56, 56') located at a distance from each other on opposite sides of the plane of the parallelogram and having first ends nearer to the stationary part (6) as well as second ends facing the opposite way, the first ends being firmly attached to the first lever (18), the coupling area (58) for the calibration weight (59) being formed at the second ends, and the load receiver extending with lateral clearance between the legs (56, 56').

4. The balance according to claim 3, where the second ends of the legs (56, 56') are configured in the shape of receiving forks (60, 60') oriented against the direction of gravity for the calibration weight (59) to be deposited in the direction of gravity.

5. The balance according to claim 3, wherein the legs are connected in an area near the second ends by a brace (57) extending transverse to the plane of the parallelogram.

6. The balance according to claim 1, wherein the force transducer (43) is located in a space between the side (4') of the load receiver (5) facing away from the stationary part (6) and the coupling area of the calibration weight and wherein further the portion (42) of the second lever (30) pointing in the direction towards the load receiver (5) has an extension that reaches as far as the force transducer (43).

7. The balance according to claim 6, wherein the force transducer (43) is supported by two cantilever arms (44, 44') that are located at a distance from each other on opposite sides of the plane of the parallelogram, extend with clearance alongside the load receiver (5), and are attached to the portion (19) of the stationary part (6) that faces towards the load receiver (5).

8. The balance according to claim 6, wherein the extension of the second lever (30) is formed by two extension legs (48, 48') that are located at a distance from each other on opposite sides of the plane of the parallelogram and are attached to the portion (42) of the second lever (30) that extends towards the load receiver (5), between which extension legs the load receiver (5) extends with lateral clearance.

9. The balance according to claim 6, wherein the force transducer (43) is an electromagnetic force compensation system having a load compensation coil, wherein further the extension legs (48, 48') have ends (52, 52') oriented towards the force transducer (43), and wherein the load compensation coil is arranged at the ends (52, 52').

10. The balance according to claim 1, wherein the load receiver (5), the guide links (7, 7'), the stationary part (6) and the levers (18, 30) are formed as integrally connected material portions of a material block (1) that are separated by material-free spaces.

11. The balance according to claim 10, wherein the material-free portions are formed at least in part only by thin linear cuts (8, 8', 13, 13', 20, 21, 22, 25, 31, 34) traversing the material block (1) across the plane of the parallelogram.

12. The balance according to claim 1, wherein a lifting mechanism (64) is prided to work in combination with the coupling area (58) for the calibration weight (59), the lifting mechanism (64) serving to transpose the calibration weight (59) between a calibrating position where it is supported by the coupling area (58) and a rest position where it is lifted off the coupling area (58).

13. The balance according to claim 12, wherein the calibration weight (59) is essentially shaped as an elongated cylinder with the longitudinal axis of the cylinder at a right angle to the direction of gravity, with the lifting mechanism (64) preventing the cylinder from rotating about its longitudinal axis.

14. The balance according to claim 13, wherein the cylindrical surface (110) of the calibration weight (59) contains a planar portion (111, 111') by which the calibration weight (59) rests in a rotationally constrained condition on three support contacts (114, 115, 116) of a lifter element (112, 112') of the lifting mechanism (64).

* * * * *